United States Patent [19]

Cole

[11] 4,278,874
[45] Jul. 14, 1981

[54] HEATING CIRCUITS
[75] Inventor: Graham M. Cole, Lymington, England
[73] Assignee: Dreamland Electrical Appliances Limited, Southampton, England
[21] Appl. No.: 64,621
[22] Filed: Aug. 8, 1979
[30] Foreign Application Priority Data
Aug. 24, 1978 [GB] United Kingdom ............... 34538/78
[51] Int. Cl.³ .............................................. H05B 1/02
[52] U.S. Cl. ................................... 219/505; 219/501; 219/212; 219/504
[58] Field of Search ............... 219/499, 494, 497, 505, 219/504, 216, 212, 501, 528; 307/117; 323/68; 337/415

[56] References Cited
U.S. PATENT DOCUMENTS

| | | | |
|---|---|---|---|
| 3,222,497 | 12/1965 | Gordon, Jr. | 219/212 |
| 3,270,184 | 8/1966 | Negromarti | 219/505 |
| 3,628,093 | 12/1971 | Crowley | 219/212 |
| 3,673,380 | 6/1972 | Crowley | 219/212 |
| 3,702,435 | 11/1972 | Endo et al. | 219/212 |
| 3,920,955 | 11/1975 | Nakata | 219/501 |
| 4,034,185 | 7/1977 | Crowley | 219/212 |

FOREIGN PATENT DOCUMENTS
1957702  8/1979  Fed. Rep. of Germany .......... 219/505

Primary Examiner—Gene Z. Rubinson
Assistant Examiner—M. H. Paschall
Attorney, Agent, or Firm—Mason, Fenwick & Lawrence

[57] ABSTRACT

A heating circuit for an electric blanket or the like comprises a cable (1) formed from a heater conductor (2) separated from a sensor conductor (3) by temperature sensitive material (4) and two series resistor-diode pairs (R1-D1 and R2-D2) each connected between ends of the conductors (2, 3) so that each pair conducts in series with the impedance (Z) of the material (4) during respective half-cycles of an AC mains supply, the arrangement being such that general overheating of the cable (1) or localized overheating anywhere along its length reduces the impedance (Z), (possibly to zero if the material (4) melts), such that the current through one or both of the resistors (R1, R2) heats the resistor(s) and blows a thermal fuse (F) to terminate heating. The thermal fuse (F) may be replaced by a resettable interruption element, namely a self-regulating PTC resistive element.

9 Claims, 3 Drawing Figures

HEATING CIRCUITS

BACKGROUND OF THE INVENTION

1. Field of the Invention

This invention relates to heating circuits. More particularly, but not exclusively, the invention relates to heating circuits for electric blankets or pads.

2. Description of the prior art

It is known to incorporate in an electric blanket a cable comprising a heating conductor, a sensor conductor and separating means that separates the two conductors and which has an impedance that falls with increasing temperature and/or which will melt in the event of overheating to allow contact between the two conductors. An AC power supply is connected across the heating conductor to heat it. Means is provided responsive to the impedance of the temperature sensitive means dropping to a value indicating overheating of the cable (which value will be substantially zero in the event of melting resulting in contact of the conductors) to prevent current flowing through the heating conductor. A disadvantage of such an arrangement is that the reliable detection of overheating becomes difficult due to the voltage gradient occurring along the heated conductor due to the fact that the supply voltage is applied across its ends. While this does not create a problem if the overheating is general, that is to say if it is present along the whole length of the cable, a difficulty arises if the overheating is localised at a position along the length of the cable, because the voltage at the position where the two conductors are connected by the reduced or zero impedance will be anywhere between the full supply voltage and zero, depending on the location of the position.

Prior attempts to solve this problem (see, for example, UK Pat. No. 793 783 and U.S. Pat. No. 2,831,099) have involved the use of complex and expensive circuitry and/or electromechanical components.

It is an object of this invention to provide a heating circuit as generally set forth above in which the above-mentioned problem of detecting both general and localised overheating is solved in a simple and reliable manner.

BRIEF SUMMARY OF THE INVENTION

According to the invention there is provided a heating circuit comprising input terminals for connection to an AC supply, a first elongate conductor connected between the input terminals to effect heating, a second elongate conductor substantially coextensive with the first conductor, and separating means that separates the first and second conductors and which has a relatively high impedance at least at normal working temperatures, the separating means being of such a nature that in the event of overheating said impedance will drop to a relatively low value and/or it will melt to permit contact of the first and second conductors whereby said impedance will drop to substantially zero. The circuit is characterised in that a first half-wave rectifier means and a first resistor are connected in series between one end of the first conductor and one end of the second conductor to permit current to flow through the first half-wave rectifier means, the first resistor and said impedance when the AC supply is of a first polarity; a second half-wave rectifier means and a second resistor are connected in series between the other ends of the first and second conductors to permit current to flow through the second half-wave rectifier means, the second resistor and said impedance when the AC supply is of the other polarity; and circuit interruption means is provided responsive to current flow through one or both of the first and second resistors indicating that said impedance has dropped in value as a result of overheating to disconnect the heating circuit from the AC supply. Thus, if a localised overheat occurs at either end of the conductors, sufficient current will flow through one of the half-wave rectifier means and the associated resistor to activate the circuit interruption means. If a localised overheat occurs between the ends, current will flow through one resistor during half-cycles of the AC supply of one polarity and through the other resistor during half-cycles of the other polarity, to again activate the circuit interruption means.

The circuit interruption means is preferably a thermally operative circuit interruption means thermally coupled to each of the resistors so that the current flowing through one or both of the resistors in the event of overheating will heat the resistor(s) to activate the circuit interruption means.

The first and second conductors and the separating means preferably constitute parts of a heating cable, preferably the form of heating cable known in the art as a dual concentric heating cable. In a socalled 'crowbar' system in which a short-circuit between the two conductors produces a virtual short-circuit across the AC supply input terminals, the cable often disintegrates in the event of a short-circuit. This is because the short-circuit is often lossy, particularly after a long period, due to oxidisation or the like of the conductors, whereby a large amount of power is dissipated across the short-circuit. In a circuit in accordance with the invention the said resistors (which are each typically around 10 K in value) are in series with the impedance of the separating means and therefore greatly reduce or eliminate the possibility of cable disintegration, since at least one of the resistors is in series with any short-circuit caused by melting of the separating means and therefore limits the short-circuit current to a value which, while sufficient to cause operation of the circuit interruption means, is several orders of magnitude less than in a crowbar system, whereby the dissipation at the site of the short-circuit is minimal.

Heating circuits in accordance with the invention are applicable to the heating of a variety of objects or media. They may be used, for example, in pipe heating, soil warming, industrial process heating or in space heating, for instance in ceiling heating or under-floor heating. The invention is, however, especially suited to the heating of an electric blanket, which term is to be deemed to encompass not only electrically heated overblankets but electrically heated underblankets, and also electrically heated pads.

BRIEF DESCRIPTION OF THE DRAWING

Other objects, features and advantages of the invention will become apparent from the following description, given by way of illustrative and non-limiting example, of preferred embodiments illustrated in the accompanying drawing, in which the same reference numerals indicate the same items throughout the various views, and in which.

DETAILED DESCRIPTION

Figure 1:
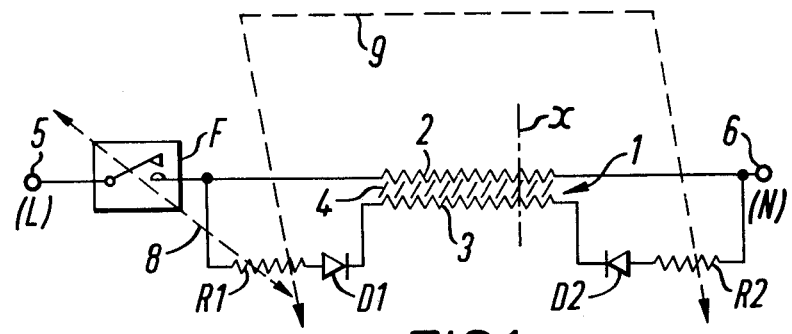
FIG. 1 is a circuit diagram of a heating circuit embodying the invention.

The heating circuit shown in FIG. 1 comprises a cable 1 which is, for example, incorporated in an electric blanket or pad in a manner known in the art. The cable 1 comprises a heating conductor 2 and a sensor conductor 3 separated by a material 4 shown in the drawing by cross-hatching. The heating conductor 2 is of resistance wire. The sensor conductor 3 does not, in this particular embodiment of the invention, carry heating current, and can therefore be a low resistance conductor, for example of copper. The cable 1 is preferably so constructed that the conductors 2 and 3 are coaxial; the heating conductor 2 is the inner one of the conductors and is wound on an electrially insulative core, the material 4 surrounds the conductor 2, the conductor 3 is wrapped or wound around the material 4, and an outer sheath covers the sensor conductor 3. The material 4 may be of such a nature that its impedance falls with an increase in temperature, preferably logarithmically. A suitable material is polyvinyl chloride (PVC). The PVC may, as is known in the art, be doped with a material that increases its conductivity, though it is preferred that undoped PVC be used. The cable 1 may in fact be constructed along the lines described in UK Patent Specifications Nos. 746 017 and 841 604.

The heating conductor 2 is connected in series with a thermal fuse F between a pair of input terminals 5, 6 for connection to the live (L) and neutral (N) conductors of an AC power supply (not shown). As is known to those skilled in the art, the thermal fuse F is a non-resettable link and comprises a current-carrying device (generally incorporating a low melting point alloy) responsive to the application of external heat to non-resettably stop the passage of current therethrough.

The series combination of a resistor R1 (10 K) and a diode D1 is connected between one end of the heating conductor 2 and the corresponding end of the sensor conductor 3, whereby the resistor R1, diode D1 and the impedance (hereinafter referred to as Z) of the separating material 4 are connected in series between the AC supply input terminals 5, 6. The diode D1 is so poled that current can only flow between the terminals 5, 6 through the resistor R1, the diode D1 and the impedance Z during positive half-cycles of the AC supply, that is to say when the terminal 5 is positive with respect to the terminal 6.

The series combination of a resistor R2 (10 K) and a diode D2 is connected between the other end of the heating conductor 2 and the corresponding end of the sensor conductor 3, whereby the resistor R2, diode D2 and the impedance Z are connected in series between the AC supply input terminals 5, 6. The diode D2 is so poled that current can only flow from the AC supply via the resistor R2, diode D2 and impedance Z during negative half-cycles of the AC supply, that is to say when the terminal 5 is negative with respect to the terminal 6.

Each of the resistors R1, R2 is thermally coupled to the thermal fuse F, as represented by dotted lines 8, 9 respectively, whereby the generation of a predetermined amount of heat by virtue of sufficient current flowing through either one or both of the resistors will cause the fuse to blow to disconnect the heating circuit from the AC supply.

The above-described heating circuit operates in the following manner. When the terminals 5, 6 are connected to the AC power supply, current flows through the heating conductor 2 and warms the blanket or pad. During positive half-cycles of the AC power supply voltage current also flows from the terminal 5 to the terminal 6 via the resistor R1, the diode D1 and the impedance Z of the material 4. However, since at normal operating temperatures the impedance Z is high, such current is negligible and produces a negligible amount of heating of the resistor R1. Similarly, during negative half-cycles of the AC power supply voltage, current flows from the terminal 6 to the terminal 5 via the resistor R2, the diode D2 and the impedance Z. Again, since the impedance Z is very high, such current is negligible and produces a negligible amount of heating of the resistor R2. As the cable 1 warms up, the impedance Z drops logarithmically so that the abovementioned currents flowing therethrough and through the resistors R1, R2 and diodes D1, D2 increases. However, the circuit is so designed that at all normal operating temperatures the currents through the resistors, R1, R2 are of insufficient magnitude to cause enough heat to be generated in the resistors to actuate the thermal fuse F. Suppose, however, that general overheating of the cable 1 occurs, that is to say that the PVC material 4 is heated along the length of the cable to a temperature approaching its melting point, which is about 160° C. The logarithmic impedance/temperature characteristics of the PVC material 4 is such that above about 140° C. there is a very large drop in the impedance Z, that is to say the material stops behaving as a good insulator. Accordingly, the currents flowing through the resistors R1 and R2 in respective half-cycles of opposite polarity of the supply voltage become of appreciable magnitude when the temperature of the material 4 is in the vicinity of its melting point, namely in a range of temperatures of about 140° to 160° C. The circuit is so designed that when the temperature of the material 4 reaches a value in this range the currents through the resistors R1, R2 are high enough to heat the resistors sufficiently to cause the thermal fuse F to blow and therefore disconnect the heating circuit from the AC power supply.

Suppose now that, instead of the cable 1 being overheated along its whole length, it becomes overheated at a localised position along its length, for example due to a ruck in the blanket or pad, a twisting or looping of the cable, or bunching of the wires of the cable. Suppose that the overheat occurs at a position x along the length of the cable 1 whereby the impedance Z of the material 4 at the position x drops to a low value. Due to the fact that current is flowing through the heating conductor 2, there will be a voltage gradient along the length thereof. Referenced to supply neutral, the voltage V(x) at the position x will vary substantially linearly between a maximum equal to the mains voltage V, if the position x is at the extreme left-hand end of the heating conductor 2, and a minimum equal to zero, if the position x is at the extreme right-hand end of the conductor 2.

During positive half-cycles of the AC supply, a potential difference equal to $V - V(x)$ will be applied across the series combination of the resistor R1, the diode D1 and the locally reduced impedance Z of the material 4. During negative half-cycles of the AC supply voltage, a voltage equal to V(x) will be applied across the series combination of the resistor R2, the diode D2 and the locally reduced impedance Z of the material 4. Thus, regardless of the location of the overheat, a substantial current will flow through the resistor R1 during positive half-cycles and/or through the resistor R2 during negative half-cycles, the resistor R1 and/or the resistor R2 producing sufficient heat to blow the thermal fuse F to disconnect the heating circuit from th AC supply. If, for example, the location of the overheat is halfway along the cable 1, the above-mentioned voltage differences causing current to flow through the resistors R1 and R2 will each be equal to half the AC power supply voltage V. If the overheat is located at the extreme left-hand end of the cable 1, no current will flow through the resistor R1, but the full supply voltage V will be applied across the series combination of the resistor R2, the diode D2 and the locally reduced impedance of the material 4 during negative half-cycles. Similarly, if the overheat is located at the extreme right-hand end of the cable 1, during positive half-cycles the full supply voltage V will be applied across the series combination of the resistor R1, the diode D1 and the locally reduced impedance Z of the material 4.

Accordingly, reliable protection against both general and localised overheating is provided, the circuit being isolated from the AC supply if the PVC material 4 obtains a temperature of 160° C. or lower, whereby combustion cannot occur.

In some instances it is possible that in the event of an overheat the material 4 might melt whereby the outer sensor conductor 3 will collapse onto the inner heating conductor 2. The resultant short-circuit is equivalent to the impedance of the material 4 locally dropping to substantially zero, whereby the current flowing through one or both of the resistors R1, R2 will be ample to blow the thermal fuse F. In fact, if such an abrupt drop in the impedance to substantially zero occasioned by melting of the material 4 is deemed sufficient for indicating localised overheating, one can employ for the material 4 a substance that need not have an impedance that varies substantially with temperature below its melting point, for instance a plastics material such as polyethylene.

The above-described circuit is highly fail-safe. No component failure can cause a failure mode in which the heat output of the circuit is increased. If either of the diodes D1, D2 fails short-circuit, current can flow from the AC supply through the series combination of the resistor R1, the diode D1, the sensor conductor 3, and diode D2 and the resistor R2, during positive or negative half-cycles of the supply voltage, depending upon which of the diodes has failed. This would cause heating of the resistors R1 and R2 whereby the thermal fuse F would be blown. If either of the diodes D1, D2 failed open-circuit, protection against localised heating would still be provided if the localised overheat occurred within the 75% or so of the length of the cable 1 nearer the failed diode. Since the diodes D1, D2 always carry a current very much less than the heating current flowing through the heating conductor 2, they can be of a low rating and can therefore be of a relatively cheap type. Further, the diodes D1, D2 are in fact unlikely to fail since in normal use they carry substantially no current and are protected from reverse transient damage by the resistors R1, R2.

The invention can, of course, be performed in other ways than that described above by way of example. For instance, the heat output of the heating circuit could be controlled by disposing means form of switch means in series with the heating conductor 2. The switch means could be electronic or mechanical and, in a manner known to those skilled in the art, could be employed to thermostatically control the heat output of the heating circuit in response to ambient temperature. It would additionally be possible to include switch means enabling a further diode to be connected in series with the heating conductor 2, the diode being positioned, for instance, with its cathode adjacent the terminal 6. Switching in of such a diode would halve the power output of the blanket by half-wave rectifying the current through the heating conductor 2. In such an arrangement, the resistor R1, the diode D1 and the diode D2 would be superfluous and could be switched out: reliable detection of localised or general overheating would then be detected by virtue of the fact that the additional diode would remove the voltage gradient across the heating conductor 2 during the half-cycles of that polrity when it is reverse-biassed whereby in the event of overheating current would flow via the reduced impedance of the material 4 and the resistor R2, the current during said half-cycles not varying with the position of the overheat, whereby the thermal fuse F would be blown. Such a circuit is disclosed in more detail in my co-pending U.S. patent application Ser. No. 971,918 filed Dec. 19, 1978. Such a circuit could be switched into further configurations, also described in my said co-pending application, in which the conductor 3 rather than the conductor 2 is used to effect heating or the two conductors are connected in parallel to effect heating. For example, if the conductors 2, 3 are 120 W and 25 W heating conductors respectively, one could obtain a full 120 W output with the configuration illustrated, a 60 W output with a diode switched-in in series with the heating conductor 2, a 25 W output with the conductor 3 switched to act as a heating conductor instead of the conductor 2, and an 85 W output with the conductors 2, 3 carrying heating current in parallel. In the illustrated configuration protection against overheating would be obtained as described above with reference to the accompanying drawing, whereas in the other configurations it would be obtained by heating of the resistor R2 by virtue of current flowing through the reduced impedance of the material 4 and the resistor R2, such current not depending on the location of the overheat during those half-cycles of the AC supply when the additional diode is reversed biassed since there is then no voltage gradient across the heating conductor or conductors employed.

A disadvantage of the circuit of FIG. 1 is that in the unlikely event of a simultaneous overheat or short-circuit occurring at both ends of the cable 1, the two diode-resistor pairs R1-D1 and R2-D2 are each effectively by-passed and the overheat protection described above is not provided. This disadvantage can be overcome by modifying the circuit of FIG. 1 in either of the respective manners shown in FIGS. 2 and 3.

Figure 2:
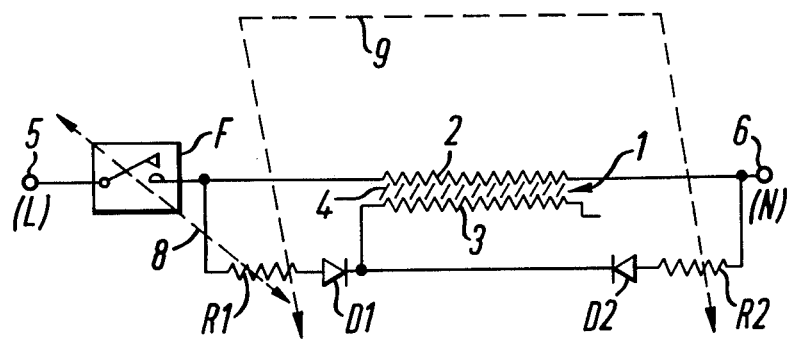
FIGS. 2 and 3 are circuit diagrams of respective modifications of the circuit of FIG. 1.

The circuit of FIG. 2 is the same as that of FIG. 1, except that the diode D2 is connected to the same end (instead of the other end) of the conductor 3 as the diode D1. This has no effect on the circuit operation other than ensuring that if an overheat or short-circuit occurs at both ends of the cable 1 simultaneously, although the diode-resistor pair R1-D1 is by-passed current flows through R2, D2 and Z during negative half-cycles causing the thermal fuse F to blow.

Like the circuit of FIG. 1, the circuit of FIG. 2 can be switched into different configuration to provide different heat outputs in the manner described in my said co-pending patent application Ser. No. 971,918.

Figure 3:
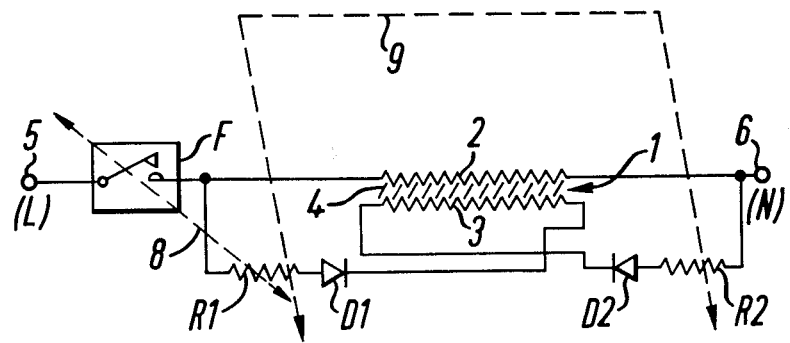

The circuit of FIG. 3 is the same as that of FIG. 1, except that each diode D1, D2 is connected to that end of the conductor 3 that is remote from the end of the conductor 2 to which the associated resistor R1, R2 is connected. With the arrangement of FIG. 3, if a short circuit due to localised overheating occurs simultaneously at both ends of the cable 1, both 'sensor arms' R1, D1 and R2, D2 cause the thermal fuse F to blow.

The circuit of FIG. 3 can be switched into different configurations to provide different heat outputs in the manner described in my said copending application Ser. No. 971,918, but in the event of a diode being positioned in series with the conductor 2, as mentioned above, the diode should be positioned between the thermal fuse F and the conductor 2 (rather than between the terminal 6 and the conductor 2) to prevent an effective short-circuit between the terminals 5, 6 in the event of an overheat at the left-hand end of the cable 1, when, in a low power setting, R2 and D2 are shunted by a further diode.

Any of the above embodiments of the invention can be modified by replacing the thermal fuse by a resettable thermally-operative circuit interruption means, in particular a simple two-terminal self-regulating positive temperature coefficient (PTC) resistive element which may be of the general form disclosed in UK Patent Specification No. 1 529 354. The expression 'self-regulating PTC resistive element', as used herein, means a resistive element that can be connected in series with an electrical load to control the supply of power to the load, the element having a positive temperature coefficient of resistance and exhibiting an anomaly in its resistance/temperature characteristic in that on the temperature reaching a value known as the switching or anomaly temperature, the resistance is subjected to a large increase whereby the element goes from a low resistance 'on' state into a high resistance 'off' state, the element regulating itself to remain in the off state until de-energised in that the increased dissipation in the device resulting from the increased voltage across it heats it and the device tends to stay at a temperature at which its resistance is high. In other words, the element is triggered into the off state and remains in such state, even in the absence of the condition causing the overheat, until it is de-energised and has had the opportunity to cool down. The element is triggered into the off state by heating by one or both of the resistors $R_1$, $R_2$.

I claim:

1. In a heating circuit comprising input terminals for connection to an AC supply, a first elongate conductor connected between said input terminals to effect heating, a second elongate conductor substantially coextensive with said first conductor, and elongate separating means that separates said first and second conductors and is in contact with each of said first and second conductors, said separating means having a relatively high impedance at least at normal working temperatures, and said separating means being of such a nature that in the event of overheating said impedance will drop to a relatively low value and/or it will melt to permit contact of said first and second conductors whereby said impedance will drop to substantially zero, the improvement comprising:

a first half-wave rectifier means and a first resistor connected in series between one end of said first conductor and one end of said second conductor to permit current to flow through the first half-wave rectifier means, the first resistor and said impedance when the AC supply is of a first polarity;

a second half-wave rectifier means and a second resistor connected in series between the other end of said first conductor and one end of said second conductor to permit current to flow through the second half-wave rectifier means, the second resistor and said impedance when the AC supply is of the other polarity; and circuit interruption means responsive to current flow through one or both of the first and second resistors indicating that said impedance has dropped in value as a result of overheating, said circuit interruption means acting to disconnect the heating circuit from the AC supply.

2. A circuit according to claim 1, wherein said first half-wave rectifier means and first resistor are connected in series between corresponding ends of said first and second conductors and said second half-wave rectifier means and second resistor are connected in series between the other corresponding ends of said first and second conductors.

3. A circuit according to claim 1, wherein said first half-wave rectifier means and first resistor are connected in series between corresponding ends of said first and second conductors and said second half-wave rectifier means and second resistor are connected in series between the other end of said first conductor and the said end of said second conductor.

4. A circuit according to claim 1, wherein said first half-wave rectifier means and first resistor are connected in series between one end of said first conductor and the remote end of said second conductor and said second half-wave rectifier means and second resistor are connected in series between the other end of said first conductor and the end of said second conductor nearer said one end of said first conductor.

5. A circuit according to claim 1, wherein said circuit interruption means is a thermally-operative circuit interruption means thermally coupled to each of said resistors so that the current flowing through one or both of the resistors in the event of overheating will heat the resistor(s) to activate the circuit interruption means.

6. A circuit according to claim 5, wherein said circuit interruption means is a thermal fuse.

7. A circuit according to claim 5, wherein said circuit interruption means is a self-regulating PTC resistive element.

8. An electric blanket incorporating a heating circuit according to claim 1.

9. An electric pad incorporating a heating circuit according to claim 1.

* * * * *